United States Patent [19]

Jorgensen

[11] Patent Number: 4,616,712

[45] Date of Patent: Oct. 14, 1986

[54] ROW FINDER

[76] Inventor: Ray G. Jorgensen, R.R. 3, Box 44, Hampton, Iowa 50441

[21] Appl. No.: 659,536

[22] Filed: Oct. 10, 1984

[51] Int. Cl.$^4$ .............................................. A01B 69/00
[52] U.S. Cl. ..................................... 172/6; 104/244.1; 172/26
[58] Field of Search ................. 172/5, 6, 26, 134, 175, 172/176, 519, 679, 667; 180/79, 131; 104/244.1; 47/1.7

[56] References Cited

U.S. PATENT DOCUMENTS

| | | | |
|---|---|---|---|
| 999,005 | 7/1911 | Bateman | 172/574 X |
| 3,797,602 | 3/1974 | Sumida | 180/131 |
| 4,060,254 | 11/1977 | Ernst | 172/446 |
| 4,367,802 | 1/1983 | Stiff | 180/131 |
| 4,463,811 | 8/1984 | Winter | 172/26 |

FOREIGN PATENT DOCUMENTS

| | | | |
|---|---|---|---|
| 2450038 | 10/1980 | France | 172/26 |
| 190686 | 2/1967 | U.S.S.R. | 172/26 |

*Primary Examiner*—Richard J. Johnson
*Assistant Examiner*—Terrence L. B. Brown
*Attorney, Agent, or Firm*—Harvey B. Jacobson

[57] ABSTRACT

An attachment associated with a tractor mounted implement to enable the implement to be accurately located with respect to the ridges in a ridge planting system or the growing crop plants to more accurately plant or cultivate the ridges in a ridge planting system and more accurately cultivate growing crop plants. The attachment or row finder of the present invention is adapted for use with a three point hitch mounted implement or a tool bar mounted implement and senses where the ridge or crop plants are and adjusts the planter, cultivator or other implement to automatically center on the ridge or row of crop plants within a predetermined tolerance. The row finder utilizes the tractor hydraulic system and electrical system for electrically sensing where the ridges or row crop plants are and to center the implement in relation thereto. The row sensor includes a pair of wheels engaging the surfaces of the ridge in a ridge planting system with the wheels actuating switches when moved to the left or the right with the switches in turn operating a solenoid controlled hydraulic valve to supply hydraulic pressure to the appropriate end of the piston and cylinder arrangement to move the implement transversely in relation to the tractor, hitch or tool bar and the ridge to center the implement with respect to the ridge. Alternatively, the ridge engaging wheels are removed and pivotal crop plant engaging arms are attached to center a cultivator in relation to the row crop plants. The sensitivity of the control switches may be varied to determine the tolerance from center.

10 Claims, 8 Drawing Figures

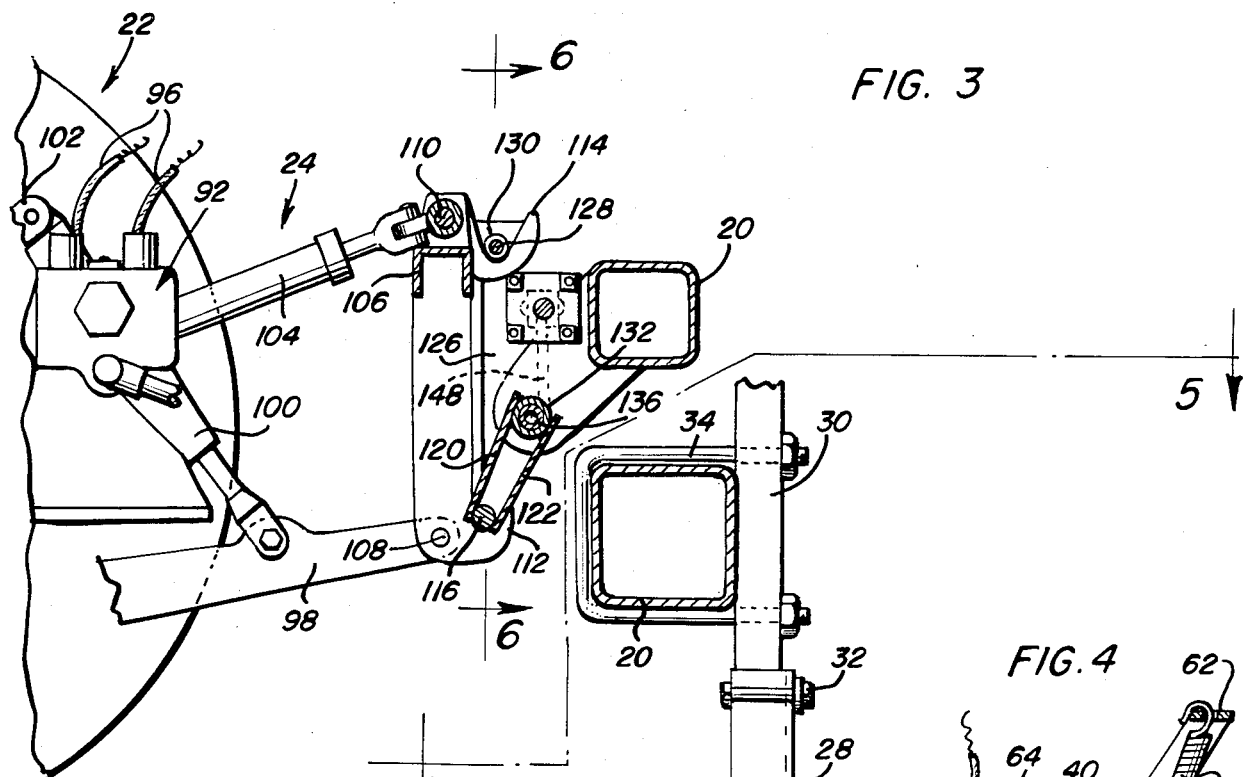

ROW FINDER

BACKGROUND OF THE INVENTION

1. Field of the Invention

The present invention relates to a row finder system associated with a tractor mounted implement such as a planter or cultivator which senses the position of a ridge in a ridge planting system or growing crop plants and laterally adjusts the implement to center the implement in relation to the ridges or row crop plants in order to more accurately plant in the ridges or cultivate row crop plants.

2. Description of the Prior Art

When planting in a ridge planting system or cultivating crop plants, it is difficult to properly center various implements in relation to the ridges or crop plants. For example, when planting seed, applying fertilizer, herbicide and the like and when cultivating and harvesting, it is desirable to center the implement in relation to the ridge or row crop plants in order for the implement to operate effectively. Efforts have been made to control the position of an implement in relation to the ridges in a ridge planting system or in relation to growing row crop plants with the following U.S. Patents relating to this field of endeavor:

| | |
|---|---|
| 2,610,562 | Sept. 16, 1952 |
| 2,664,802 | Jan. 5, 1954 |
| 2,981,355 | April 25, 1961 |
| 3,118,505 | Jan. 21, 1964 |
| 3,208,535 | Sept. 28, 1965 |
| 3,326,319 | June 20, 1967 |
| 3,430,723 | March 4, 1969 |

SUMMARY OF THE INVENTION

An object of the present invention is to provide a row finder adapted to be attached to a tractor three point hitch mounted implement or a tool bar mounted implement and enables the user to more accurately plant crops on the ridge when using a ridge plant system or more accurately cultivate crop plants by sensing where the growing row crop plants are and adjusts the planter or cultivator automatically to center on the row within a predetermined tolerance on each side of center in order to maintain the implement within a specified tolerance of center.

Another object of the invention is to provide a row finder including a sensor mounted on the tool bar and a hydraulic piston and cylinder assembly interconnecting the implement and the tool bar or three point hitch controlled by a solenoid valve for communicating selected ends of the piston and cylinder arrangement with the hydraulic system of the tractor with the solenoid valve being controlled by electrical switches which are activated by a sensing device which senses the position of the ridge or the row crop plants and correspondingly actuates the switches to center the implement in relation to the ridge or crop plants.

A further object of the invention is to provide a row finder in accordance with the preceding objects for use in a ridge planting system or sensing the position of row crops in any planting system and centering the planter in relation to the ridge or centering the cultivator in relation to the row crop plants with ridge sensing and crop plant sensing devices being interchangeable for adapting the row finder to its various uses with the device sensing either the ridge or row crop plants controlling the position of the implement through adjustable electrical switches and a solenoid operated control valve for controlling flow of pressurized hydraulic fluid to a piston and cylinder assembly interconnecting the implement and its connection with a tractor for laterally adjusting the implement to center it in relation to the ridge or the row crop in an efficient manner which will accurately locate the implement in relation to the ridge or row crop.

Still another object of the invention is to provide a row finder system utilizing a hydraulically operated mechanism for laterally adjusting an implement in relation to a tractor hitch, tool bar or the like in which the hydraulic mechanism is controlled by a sensing device engaging and locating ridges in a ridge planting system or row crow plants in any type of planting system with the device being effective even though trash or other debris may be on the ground surface such as occurs in minimum tillage planting operations.

A still further object of the present invention is to provide a row finder in accordance with the preceding objects which can be easily and quickly installed in relation to various types of tractors and implements with minimum modification and which is efficient in centering the implement in relation to a ridge or row crop plants.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 is a vertical sectional view illustrating the hydraulic piston and cylinder assembly between the tractor hitch and tool bar of the implement.

FIG. 4 is a sectional view of the tool bar and sensing device associated with the ridges in a ridge planting system.

FIG. 7 is an exploded group perspective view illustrating the sensing device and horizontal movement device of the present invention including the solenoid control valve operated by the switches on the sensing device.

DESCRIPTION OF THE PREFERRED EMBODIMENT

Figure 1:
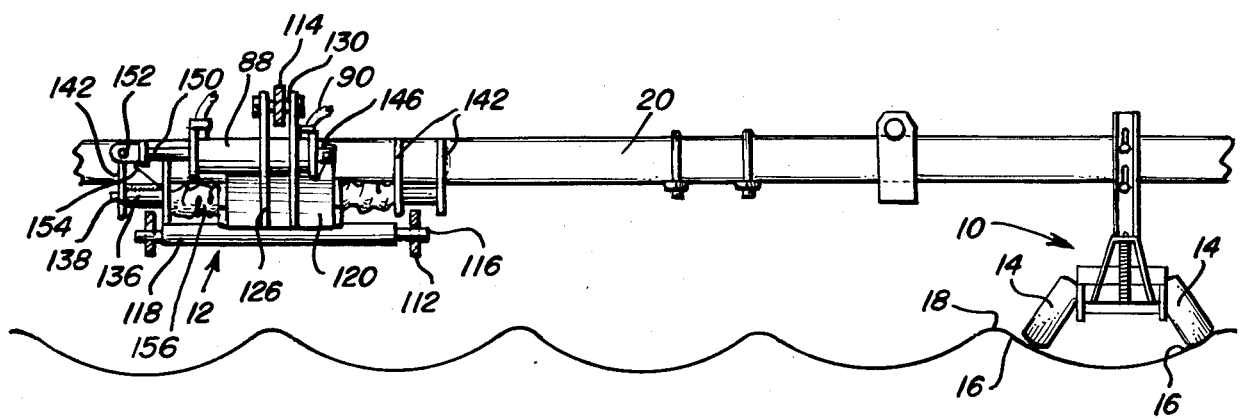
FIG. 1 is a front elevational view of the row finder of the present invention associated with an implement tool bar and illustrating the association of the sensing wheels in relation to adjacent planting ridges.

Referring now specifically to the drawings, the row finder of the present invention includes a sensing device 10 and a horizontal adjusting device 12. As illustrated in FIGS. 1-7, the sensing device 10 includes spaced wheels 14 which engage the inner inclined surfaces 16 of a pair of ridges 18 in a ridge planting system. The sensing device 10 is attached to a horizontally disposed tool bar 20 positioned transversely at the rear of a conventional farm tractor 22 having a three point hitch assembly 24 or other hitch assembly for supporting the tool bar 20. The adjusting device 12 is interposed between the tool bar 20 and the three point hitch structure 24 in order to laterally move the tool bar 20 in relation to the tractor 22 and in relation to the ridges 18 in the ridge planting system in order to center planters or other implements in relation to the ridges 18 for more accurately planting seeds in relation to the center apex of the ridges 18.

Figure 2:
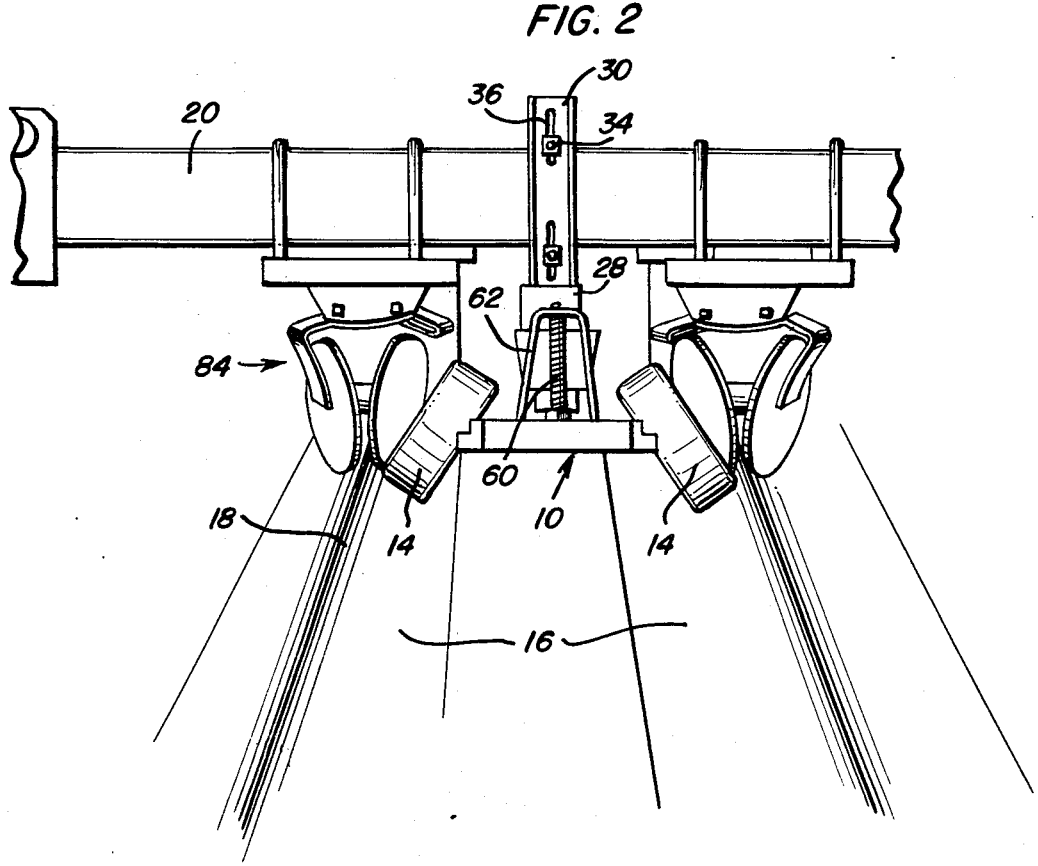
FIG. 2 is an enlarged elevational view of the row finder system of the present invention associated with an implement tool bar.
Figure 5:
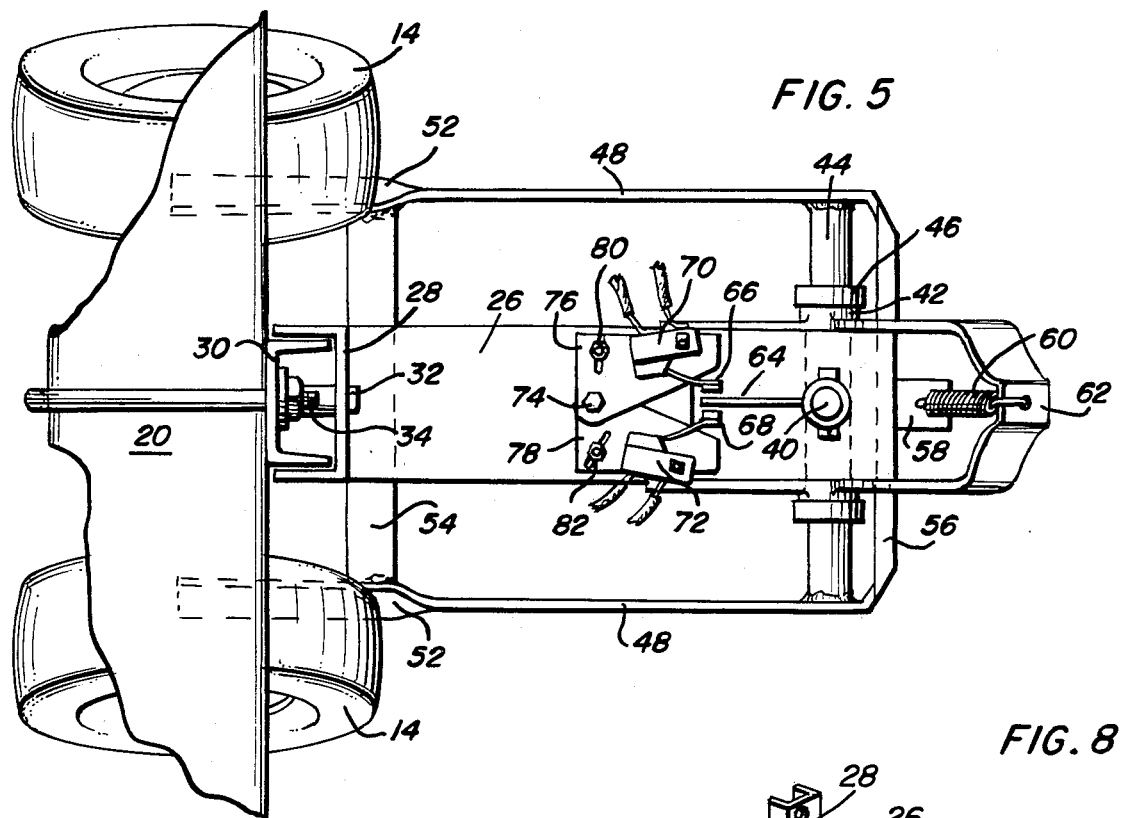
FIG. 5 is a plan view of the sensing device taken along reference line 5—5 on FIG. 4 illustrating the electrical switches operated by the sensing wheels.

The sensing device 10 includes an elongated mounting bar 26 extending horizontally rearwardly from an upstanding mounting member 28 at the front end thereof with both the mounting bar 26 and mounting member 28 being of channel-shaped construction and rigidly secured together in perpendicular relation as by welding or the like. The upstanding mounting member 28 telescopically receives a channel-shaped mounting member 30 in nested relationship as illustrated in FIG. 5 with a bolt 32 securing the mounting member 30 to the mounting member 28. The mounting member 30 extends across the tool bar 20 in perpendicular relation thereto and is adjustably secured thereto vertically by a U-bolt 34 having its ends extending through vertical slots 36 in the mounting member 30 as illustrated in FIG. 2 in order to adjustably support the sensing device from the tool bar 20. Alternatively, the slots 36 may be replaced with a plurality of vertically spaced apertures to eliminate any possible vertical slippage of the mounting member 30 in relation to the tool bar 20.

At the rearward end of the mounting bar 26, a vertical bushing 38 is rigidly affixed and receives a vertical shaft 40 therethrough. Positioned below the mounting bar 26 and rigid with shaft 40 is a transverse bushing 42 receiving a horizontal shaft 44 therethrough which extends beyond the bushing 42 and is provided with adjustable set screw anchored collars 46 to center the shaft 44 laterally in relation to the bushing 42. The outer ends of the shaft 44 are rigidly secured to forwardly extending mounting arms 48 which extend forwardly and downwardly and journal the wheels 14 on the forward end thereof for rotation about an axle 50. Adjacent the end of the arms which extend alongside of the wheels 14, the arm 48 is twisted slightly as indicated by numeral 52 and a transverse brace 54 rigidly interconnects the forward ends of the arms 48 at the twisted portions 52 as illustrated in FIG. 5. The vertical shaft 40 is fixed to the horizontal bushing 42 for rotation about a vertical axis in relation to the bushing 38 so that as the wheels 14 follow the ridges 18, the mounting arms 48 may pivot about a vertical axis defined by the shaft 40 so that the wheels 14 can follow the ridges. The rearward ends of the mounting arms 48 are interconnected by transverse connecting member 56 having a rearwardly projecting centrally located tab 58 affixed thereto which receives one end of a tension coil spring 60 that has its upper end attached to the central portion of an upstanding and forwardly inclined inverted U-shaped member 62 that is rigidly affixed to the rearward end of the mounting bar 26 which spring biases the wheels 14 downwardly into engagement with the ground surface about the horizontal axis defined by the shaft 44 with the spring 60 also enabling the wheels 14 to move up and down to follow variations in elevation of the terrain engaged by the wheels 14.

In order to sense the pivotal movement of the mounting arms about a vertical axis defined by the shaft 40, the shaft 40 is provided with a forwardly extending finger or arm 64 with the forward end of the finger 64 being received between a pair of horizontally spaced switch arms 66 and 68 forming part of a pair of switches 70 and 72 which are mounted on the mounting bar 26 by a bolt 74 extending through and forming a pivot axis for a mounting plate 76 for the switch 70 and a mounting plate 78 for the switch 72. Each of the mounting plates 76 and 78 is provided with an arcuate slot 80 receiving a bolt 82 therethrough by which the mounting plates 76 and 78 can be pivoted to move the actuating arms 66 and 68 of the switches 70 and 72 closer to or further away from the free end of the finger 64. With this construction, as the wheels 14 follow the ridges and pivot mounting arms 48 about the vertical shaft 40, the finger 64 will come into contact with one of the actuating arms 66 or 68 and correspondingly actuate the switch 70 or 72 to control the adjusting mechanism 12 in a manner to move the tool bar 20 horizontally to center a planter or other implement generally designated by numeral 84 in relation to the ridge 18 or to center other implements such as a cultivator in relation to a row crop by using alternative structure as described hereinafter.

The adjusting device 12 is oriented between the hitch structure 24 and the tool bar 20 in order to move the tool bar horizontally and transversely of the tractor 22 and the ridges 18 or row crop plants in response to actuation of the switches 70 and 72 and includes a horizontally disposed piston and cylinder arrangement generally designated by numeral 86 and which includes a cylinder 88 having hydraulic hoses 90 connected and communicated with each end thereof with the hoses 90 being connected to a solenoid valve assembly 92 that is connected and communicated with the hydraulic system of the tractor 22 through hoses 94 in a conventional manner. The solenoid valve 92 is electrically connected to the switches 70 and 72 through electrical conductors 96 as illustrated schematically in FIG. 7.

The hitch assembly 24 is a conventional three point hitch including a pair of lower members 98 pivoted at their forward ends to the tractor, a pair of lift links 100 connected to the lower members 98 and to a pair of lift arms 102 with a single adjustable top member 104 generally paralleling the lower members 98 with the rearward ends of the members 98 and upper member 104 being connected to a generally vertical frame 106 by pins 108 and 110 in a conventional manner with the frame 106 including a pair of lower upwardly facing hooks 112 and a single upper centrally disposed upwardly facing hook 114 for attachment to the tool bar 20. The lower pair of hooks 112 engage reduced pins 116 inserted into and rigidly affixed to a horizontally disposed tube 118 having a pair of plates 120 and 122 rigidly affixed thereto as by welding 124 as shown in FIG. 3. The upper surface of the upper plate 120 includes a pair of upstanding brackets 126 which extend upwardly and are interconnected by a bolt or pin 128 having a sleeve 130 thereon between the upper ends of the plates 126 for receiving and engagement by the upper hook 114 with the pin 128 being in the form of a bolt and the sleeve 130 being in the form of a spacer which is engaged by the hook 114.

The two plates 120 and 122 extend upwardly in slightly diverging relation and the upper edges are rigidly connected to a tubular sleeve 132 as by welding 134. The sleeve 132 is slidably mounted on a horizontal tube 136 having reduced pins 138 inserted into and adjustably affixed therein with pins 138 received through apertures 140 in a right and left pair of forwardly and downwardly extending bracket plates 142 rigidly affixed to the tool bar 20 as by welding 144. The cylinder 88 includes a clevis-type bracket 146 connected to a bracket 148 that is rigidly affixed to the sleeve 132 or upper plate 120, and the piston rod 150 of the piston and cylinder assembly 86 is attached by a clevis connector 152 to a bracket 154 on a portion of the tube 136, which is cut long enough to fit closely between the brackets 142. FIG. 1 illustrates the placement of these components. Thus, inward and outward movement of the piston rod 150 causes the tube 136 mounted between the brackets 142 on the tool bar 20 to move longitudinally in the sleeve 132 which is rigidly affixed to the plates 120 and 122 and the tube 118 as well as the bracket plates 126 and thus horizontally stationary with respect to the hooks 112 and 114 and the entire hitch assembly 24 as well as tractor 22 so that the longitudinal reciprocation of the piston rod 150 will move the tool bar 20 and thus the implements supported thereon horizontally and transversely of the path being traversed by the tractor for centering the implement in relation to a ridge 18 or a row of plants in a manner described hereinafter.

As illustrated in FIG. 1, the external surface of each end of the tube 136 on which the sleeve 132 slides is protected by a bellows-type expansable covering 156 of rubber or similar material to protect the relative sliding surfaces from dirt, dust and the like. Likewise, the sensing device including the switches may be provided with a protective covering attached to the mounting bar 26 in any suitable manner.

Figure 8:
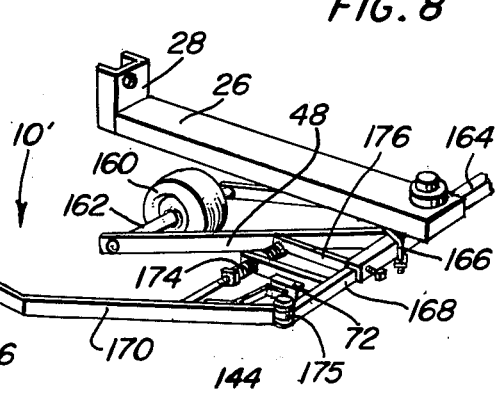
FIG. 8 is a perspective view of an alternative sensing device used with growing crop plants.
Figure 6:
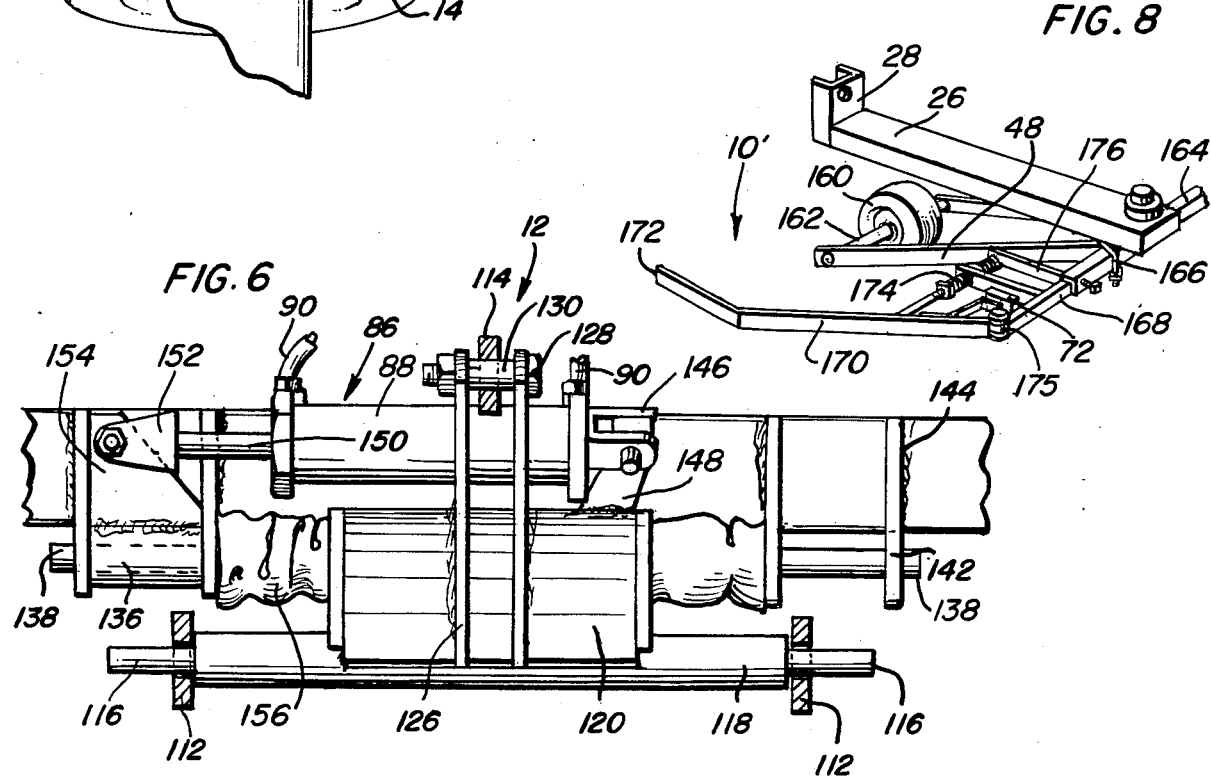
FIG. 6 is an enlarged sectional view taken substantially upon a plane passing along section line 6—6 on FIG. 3 illustrating further structural details of the horizontally disposed piston and cylinder assembly for moving the tool bar and implement laterally of the tractor hitch.

FIG. 8 illustrates an alternative sensing device 10' used when the plants of a growing crop are used to activate the system such as when cultivating the crop. In this arrangement, the two wheels 14 are removed and a single wheel 160 is positioned between the forward ends of the mounting arms 48 on an axle 162 affixed therebetween. Also attached is a cross piece 164 secured to the mounting arms by U-bolts 166 or the like with the member 164 adjustably receiving support members 168, such as by a set screw connection, which pivotally support a pair of rearwardly extending arms 170 at the outer ends thereof with the terminal ends of the arms 170 being angulated as at 172. A centering spring assembly 174 interconnects the arms 170 and a bracket 176 extending rearwardly from the member 168 to provide an adjustable spring bias and positioning of the angulated end 172 which is adapted to engage growing plants in a manner which will not cut or destroy the plants when engaged by the angulated end 172. Likewise, when the angulated end 172 engages the plants, the adjustable lightweight spring structure 174 is such that it will permit the arm 174 to swing inwardly about vertical hinge member 175. As illustrated, the switches 70 and 72 have been moved to the outer ends of the members 168 at the hinge axis as at 175 with only switch 72 being shown in FIG. 8 so that when the arms 170 are moved inwardly by the engagement with crop plants, the switches will actuate the adjusting device in the same manner as the wheels when following a ridge.

Also, with reference to both FIGS. 4 and 5, a travel stop is provided for the mounting arms 48 which limits the swinging movement thereof when the wheels 14 are used but which is adjusted to lock the mounting arms 48 when the single wheel 160 is used. The travel stop includes a pivoting block 180 having a spring 182 on each side thereof with a U-shaped member 184 being secured to the mounting bar 26 by a slot 186 and a bolt to enable the U-shaped member 184 to be moved toward the pivot axis defined by shaft 40 to engage the mounting arms 48 to limit their pivotal movement and to lock them in position when the single wheel is used. This prevents the mounting arms from moving too far to either side before reaction of the control system thereby preventing damage to the electrical switches. The pivot block 180 is affixed with respect to the transverse bushing 42 and pivots therewith about a vertical axis defined by the vertical shaft 40.

If the implement does not include support wheels in the rear, it is necessary to provide a third point with which to pick the entire unit up with. This third point would be secured to the upstanding brackets 126 in generally overlying relation to the cylinder and is in the form of the tubular member similar to 136 and 134. These tubular pieces would be slidably inserted and pinned with a pin similar to pin 138. The brackets 142 would be modified to extend upwardly to a level even with the top of brackets 126. This portion of the unit has not been shown in the drawings but the explanation is included since the unit would still operate in the same manner when supported by the rear wheels or by the hitch.

The row finder system of this invention enables the user to more accurately plant crops on the row when using a ridge plant system or more accurately cultivate crops by sensing where the ridge or growing crop is and adjusting the planter or cultivator to center on the row or in relation to the growing crop within a tolerance of a predetermined distance such as 6 inches. The adjusting arrangement is mounted between the tool bar and the normal hitch points for the implement and inserting the usual pin or pins to secure the assembly in place. The sensing device mounts by merely bolting it around the tool bar and centering it between the rows. The sensing device is electrically connected to a solenoid valve in the hydraulic system of the tractor for controlling operation of the adjusting arrangement with the sensing device electrically sensing where the ridge or crop plants are and the adjusting device hydraulically moving the mounted implement sideways or transversely to keep it on center with respect to the ridge or the growing crop plants. The sensing unit illustrated in FIG. 5 with the two inclined wheels is used to sense the ridge and when the wheels move either left or right the finger extending between the switches pushes one of the switch arms and activates the hydraulic valve to direct the oil into the correct port on the cylinder. The switches can be adjusted in order to set the sensitivity of the switches and determine the tolerance from center that the user wishes. A travel stop and centering arrangement, as best seen in FIG. 4 is provided for the supporting assembly for the two wheels which includes a pair of springs positioned on each side of a pivoting block with the travel stop being adjusted to limit movement of the wheels about the vertical axis to protect the switches. When using the sensing device to sense growing crop plants during a cultivating operation, the pair of inclined wheels is removed and a single wheel is mounted on a transverse axle between the mounting arms as illustrated in FIG. 8 and the travel stop is adjusted to hold the single wheel stationary for movement in a straight forward manner. In this arrangement, the switches are moved from the mounting bar to the outer ends of an adjustable cross piece which is bolted to the mounting arms. The elongated arms which contact the growing plants are lightly spring biased by adjustable spring assemblies and when the arms engage the plants they are deflected inwardly by the plants and the switches will be actuated in the same manner as the ridge sensing unit in order to center the implement in relation to the growing crop plants.

The hitch assembly includes a solenoid directional valve and a piston and cylinder assembly interposed between the tractor hitch and the tool bar to which the implements are connected in order to move the tool bar and thus the implements sideways in response to control by the sensing unit and the solenoid valve. Thus, as the two ridge engaging sensing wheels are moved left or right, the hydraulic piston and cylinder assembly will be correspondingly activated to move the tool bar and thus the implement or planter in a manner to center the planter in relation to the ridge. Likewise, when one of the arms 170 is moved inwardly by its engagement with the plant, the tool bar and implement or cultivator mounted thereon is correspondingly moved sideways to center the cultivator in relation to the growing crop plants.

The row finder system of this invention is economically feasible from a manufacturing and expense standpoint and is constructed to function in various debris that is left on the surface of the ground when using minimum till systems of farming and withstands the stresses of large and heavy implements which are presently in use. The piston and cylinder assembly used to move the tool bar in relation to the tractor hitch is a standard, commercially available item and the other components used are also readily available. The system may be used with various types of tractor-implement hitch arrangements and can be used with various implements in which it is important to accurately locate the implement in relation to a planting or crop ridge in a ridge planting system or in relation to growing row crop plants in order to accurately maintain the implement in predetermined relation to the ridge or row crop plants. The various springs may be adjusted in a conventional manner and those components involving relative rotation or sliding movement are provided with suitable lubrication features and those components that may be adversely affected by dirt, dust, rain and the like are provided with protective covers. The sensing device may be attached to the tool bar in an adjustable manner by the use of conventional U-shaped mounting bolts and the sensing device may be converted from one which uses the two wheels engaging the inclined sidewalls of adjacent ridges to a single wheel with row crop plant engaging arms in a quick and easy manner without altering the basic operational characteristics of the invention. The piston and cylinder assembly and its associated bracket structures are easily connected to the normally provided connecting brackets on the tool bar and likewise easily connected to the hitch structure provided on the tractor without modification of either the tool bar or the tractor hitch. These components are thick walled pipe and inserted reduced diameter pins which facilitate insertion through apertured brackets and provide hitch points for engagement with the hitch of the tractor.

While the invention has been illustrated in combination with a tool bar mounted planter, cultivator or other implement, it can also be used with various types of pull-type planters, cultivators or other implements to move the towing tongue sideways instead of moving a tool bar and its supported implement. Thus, the sensing device may be mounted on a planter or other implement that is towed or pulled by a tractor by the implement having a tongue attached to the drawbar of the tractor. The sensing unit would sense off center movement of the planter or implement in exactly the same manner as it would when attached to a tool bar as illustrated and the adjusting device would be connected between the tongue and tractor drawbar or hitch or between the tongue and the frame of the towed implement in a manner to move the tongue sideways and thus move the towed implement sideways in response to control signals from the sensing device to retain the imnplement on center of the ridge or growing crop plants. The dimensional characteristics of the various components may be varied commensurate with the strength requirements required and to adapt the device to various existing implements, tractors and the like.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A row finder system for positioning an implement in predetermined orientation in relation to a desired path of movement of the implement comprising a sensing device supported for engagement with guide means defining the desired path of movement of the implement and an adjusting device supported for moving the implement sideways in relation to the actual path of movement in response to control from the sensing device to maintain the implement in predetermined orientation in relation to the guide means defining the desired path of movement, said adjusting device comprising a generally horizontally disposed piston and cylinder assembly oriented transversely of the path of movement and interposed between a vehicle and implement connected thereto for moving the implement sideways in relation to the vehicle in response to control from the sensing device, said implement being supported from a transversely extending tool bar, said sensing device also being supported from said tool bar, said adjusting device being interposed between the tool bar and a three point hitch mounting assembly of a farm tractor, said adjusting device including a double acting hydraulically operated piston and cylinder assembly, means connecting one end of the piston and cylinder assembly to the tool bar and means connecting the other end of the piston and cylinder assembly to the hitch assembly of the farm tractor for moving the tool bar sideways in relation to the hitch assembly, said means connecting the piston and cylinder assembly to the tool bar includes brackets on the tool bar laterally fixedly engaged with a horizontal support member, a sleeve slidable on the horizontal support member, said sleeve having upper and lower three point hitch mounting connections secured thereto one end of the piston and cylinder arrangment being connected to the sleeve on one lateral side of the upper connection and the other end being connected to the horizontal support member of the other lateral side of the upper connection to cause reciprocal movement of the tool bar upon actuation of the piston and cylinder assembly.

2. The structure as defined in claim 1 wherein said guide means includes a ridge in a ridge planting system, said sensing device including wheel means engaging and being guided by said ridge with deviation of the wheel means from a desired path of movement controlling the adjusting device to move the implement sideways to center it in relation to the ridge and the desired path of movement.

3. The structure as defined in claim 2 wherein said wheel means includes a pair of inclined wheels, a mounting assembly for supporting said wheels and enabling said wheels to follow the inclined side surfaces of a pair of ridges, switch means mounted for actuation by said wheel mounting assembly when the wheels move laterally in relation to the implement.

4. The structure as defined in claim 3 wherein said piston and cylinder assembly is communicated with the hydraulic system of the farm tractor through a solenoid controlled valve, said switch being connected to the valve and electrical system of the tractor for controlling the valve and position of the tool bar and implement in response to actuation of the switch means.

5. The structure as defined in claim 1 wherein said guide means comprises growing crop plants, said sensing device including elongated arms engaged with the plants with the arms being moved in response to engagement with the plants to control the adjusting device to center the implement with respect to the crop plants and the desired path of movement.

6. The structure as defined in claim 5 wherein said piston and cylinder assembly is communicable with the hydraulic system of the farm tractor through a solenoid controlled valve, said switch being connectable to the valve and electrical system of the tractor for controlling the valve and position of the tool bar and implement in response to actuation of the switch means.

7. A row finder system for positioning an implement in predeterminded orientation in relation to a desired path of movement of the implement along a ground surface comprising a sensing device supported for engagement with guide means associated with the ground surface and defining the desired path of movement of the implement and an adjusting device supported for moving the implement sideways in relation to the actual path of movement in response to control from the sensing device to maintain an implement in predetermined orientation in relation to the guide means defining the desired path of movement, said guide means adapted to cooperate with a ridge in a ridge planting system, said sensing device including wheel means adapted to cooperate with a guided by said ridge with deviation of the wheel means from a desired path of movement controlling the adjusting device to move the implement sideways to center it in relation to the ridge and the desired path of movement, said adjusting device comprising a generally horizontally disposed piston and cylinder assembly oriented transversely of the path of movement and interposed between a vehicle and implement connected thereto for moving the implement sideways in relation to the vehicle in response to control from the sensing device, said implement being supported from a transversely extending tool bar, said sensing device also being supported from said tool bar, said adjusting device being interposed between the tool bar and a three point hitch mounting assembly, said adjusting device including a double acting hydraulically operated piston and cylinder assembly, means connecting one end of the piston and cylinder assembly to the tool bar and means connecting the other end of the piston and cylinder assembly to the three point hitch mounting assembly for moving the tool bar sideways in relation to the hitch assembly, said means connecting the piston and cylinder assembly to the tool bar including brackets on the tool bar engaged with a horizontal support member, a sleeve slidable on the horizontal support member and laterally fixedly engaged with the three point hitch mounting assembly, one end of the piston and cylinder arrangement being connected to the sleeve and the other end being connected to the horizontal member to cause lateral movement of the tool bar upon actuation of the piston and cylinder assembly, said wheel means including a pair of inclined wheels, a mounting assembly for supporting said wheels and enabling said wheels to follow the inclined side surfaces of a pair of ridges, switch means mounted for actuation by said wheel mounting assembly when the wheels move laterally in relation to the implement, said piston and cylinder assembly being communicated with the hydraulic system of the farm tractor through a solenoid controlled valve, said switch means being connected to the valve and electrical system of the tractor for controlling the valve and position of the tool bar and implement in response to actuation of the switch means, said switch means including two adjustably supported switches to sense deviation in two directions.

8. The row finder as defined in claim 7 wherein said sensing device comprises a mounting bracket laterally and vertically adjustably supported from a tool bar, a longitudinally extending mounting member rigid with said bracket and disposed in perpendicular relation to a tool bar, said mounting assembly for the wheels includes a pair of rigidly interconnected arms rotatably journaling the wheels for rotation about inclined axes, means connecting the arms to said mounting member enabling pivotal movement of the arms and wheels about a vertical axis and a transverse horizontal axis, spring means interconnecting the mounting member and arms to bias the arms and wheels downwardly about said horizontal axis.

9. The row finder as defined in claim 8 wherein said switches are adjustably mounted on said mounting member, each switch including an actuating arm, and an actuating member rigid with said wheel supporting arms and disposed between said switch actuating arms to actuate said switches in response to pivotal movement of the wheels and their supporting arms about said vertical axis.

10. The row finder as defined in claim 9 wherein said spring means biasing said wheel supporting arms to spring bias the wheels downwardly about a horizontal axis also biases the wheels and their supporting arms to a central position about said vertical axis.

* * * * *